Dec. 23, 1958
N. S. FOCHT
2,865,396
METERING VALVE FOR SHOCK ABSORBERS
Filed Aug. 15, 1950
4 Sheets-Sheet 3
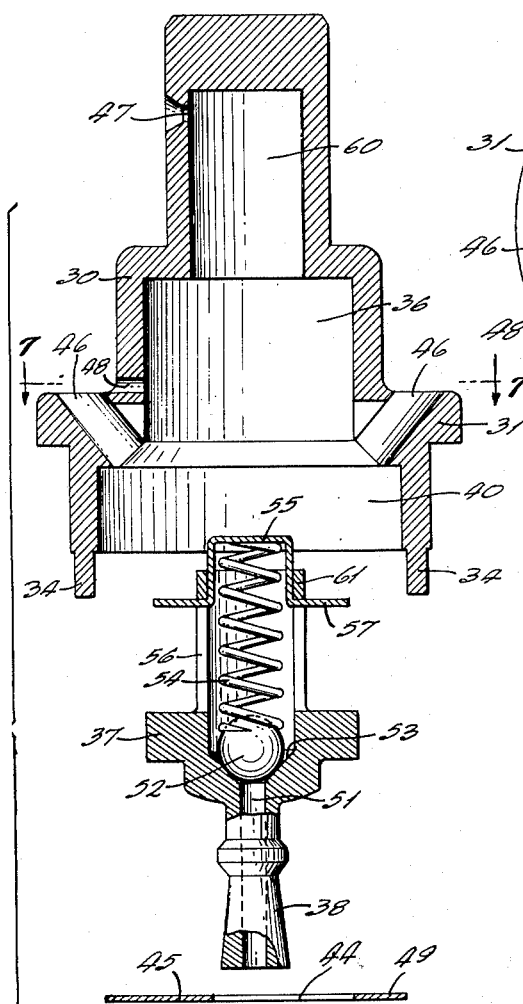
Fig. 6
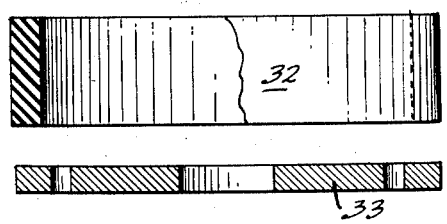
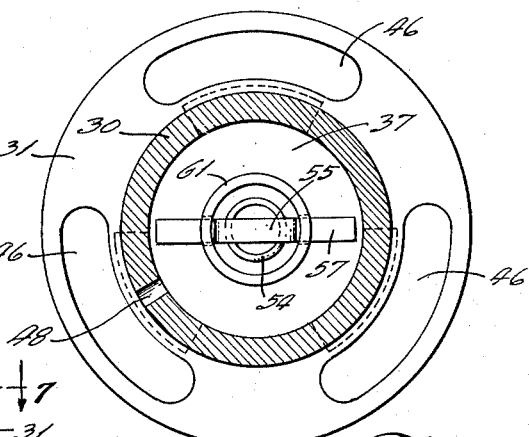
Fig. 7
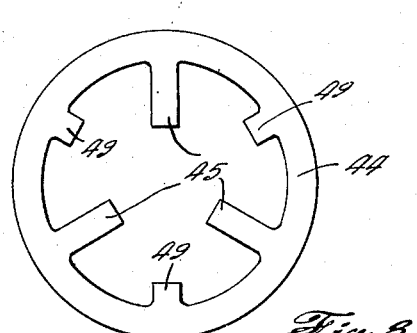
Fig. 8
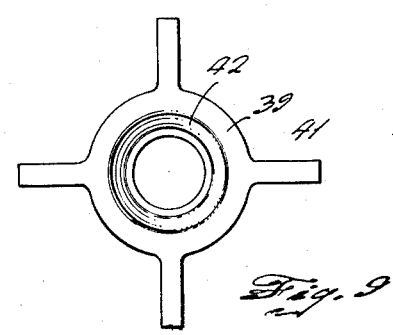
Fig. 9
INVENTOR.
NEVIN S. FOCHT
BY
ATTORNEYS.

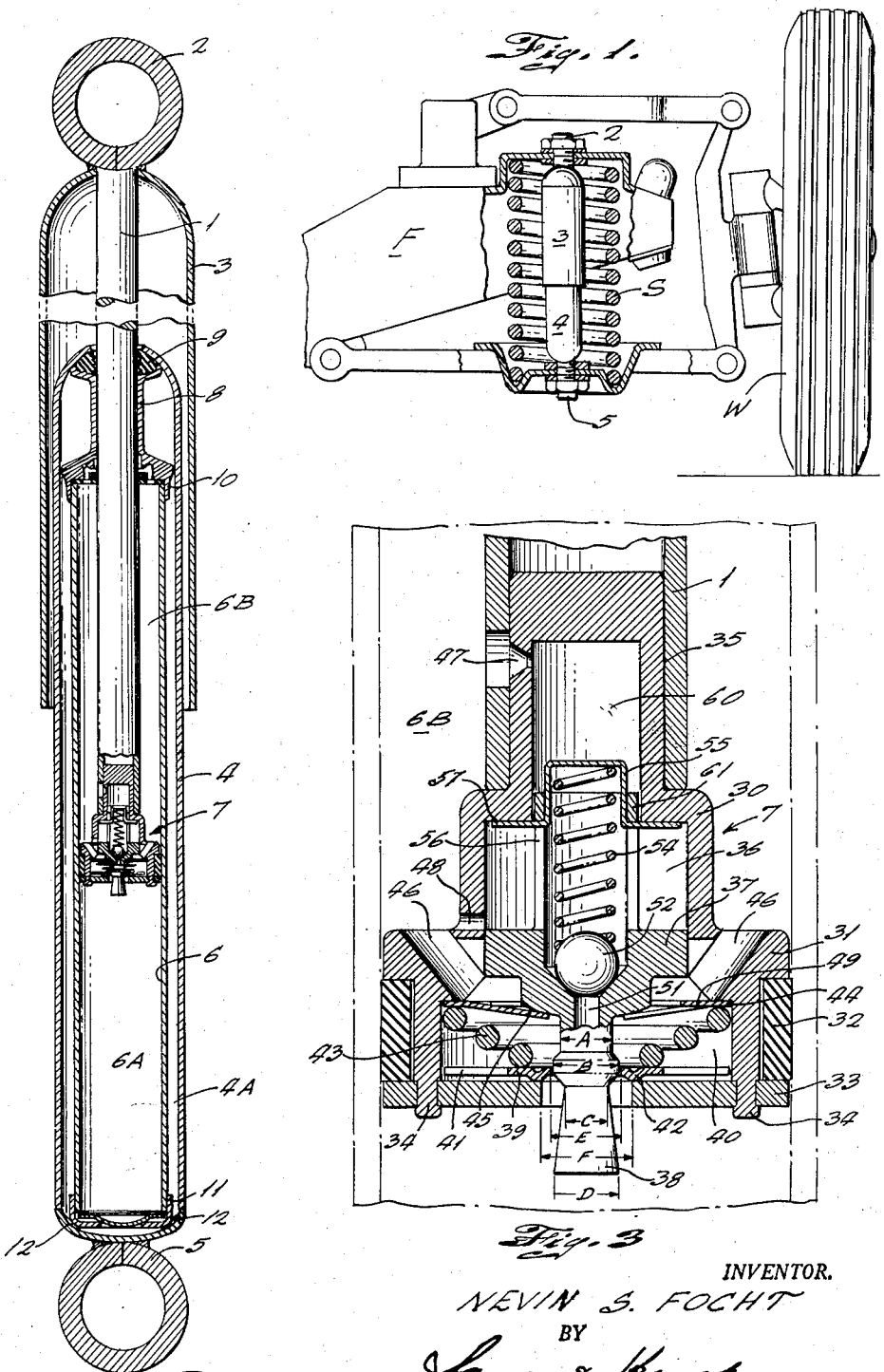

Dec. 23, 1958 N. S. FOCHT 2,865,396
METERING VALVE FOR SHOCK ABSORBERS
Filed Aug. 15, 1950 4 Sheets-Sheet 4

INVENTOR.
NEVIN S. FOCHT
BY
ATTORNEYS.

United States Patent Office 2,865,396
Patented Dec. 23, 1958

2,865,396
METERING VALVE FOR SHOCK ABSORBERS

Nevin S. Focht, Garden City, N. Y.

Application August 15, 1950, Serial No. 179,567

4 Claims. (Cl. 137—493.3)

This invention relates to improvements in shock absorbers.

More particularly, the invention is concerned with hydraulic energy absorbing devices, such as used in automobiles, aircraft landing gear struts, various recoil mechanisms and in various applications where it is desired to absorb energy for cushioning an impact or damping oscillations. The energy to be absorbed may consist substantially of a single recoil or impact or may be of an oscillatory character and the shock absorbing device may be associated with mechanical or pneumatic spring devices. Shock absorbers for use in automobiles are required to deal with disturbances of a great variety of amplitudes and frequency and the shock absorber of the invention will be described applied to an automobile wheel suspension as illustrating the novel features to the fullest extent.

An object of the invention is to provide a shock absorber valve mechanism having improved characteristics in discriminating between applied disturbances of different frequencies and different amplitudes.

Another object of the invention is to provide a shock absorber valve mechanism which is capacitated to respond differently to identical disturbances, depending upon previous disturbances applied to the system, as, for example, in discriminating between a recoil following a bump and a recoil upon entering a hole, where applied to an automobile wheel suspension.

A further object of the invention is to provide a hydraulic resistance system capable of supplementing mechanical and pneumatic spring action for large compressions and of decreasing substantially the effective rate for small amplitude disturbances.

With the foregoing objects as well as others which will appear in the following full description in mind, the invention consists in the combinations and arrangements of parts and details of construction, which will now be first fully described with reference to the accompanying drawing and then be more particularly pointed out in the appended claims.

In the drawing:

Figure 1 is a schematic view showing a shock absorber and spring mounted in an independent suspension front wheel assembly;

Figure 2 is an enlarged view in central longitudinal section of the shock absorber of Figure 1;

Figure 3 is an enlargement of a portion of Figure 1, showing the piston structure;

Figure 6 is an exploded view showing the elements forming the piston structure of Figures 3 and 5;

Figure 7 is a detail section on the line 7—7 of Figure 6;

Figures 8 and 9 are plan views of certain elements of Figure 6;

Figure 4:
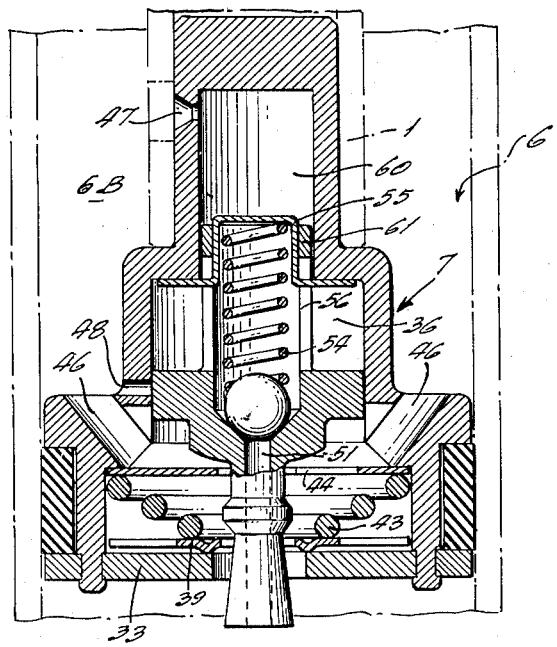
Figures 4 and 5 are similar to Figure 3, but show the parts in different operating positions.

The shock absorber of the present invention comprises a piston rod 1, provided with an end fitting 2 for attachment to the frame structure or to the wheel axle or other wheel mounting of the vehicle. The fitting 2 may take any desired form, according to the class of service, the form shown in Figure 2 being suitable for some mountings and the form shown in Figure 1 being suitable for others. A dust cover 3 is attached to the piston rod 1, and the outer or reservoir cylinder 4 is reciprocably mounted about the piston rod and within the cover as shown. Element 4 is also provided with a suitable fitting 5 for attachment to a wheel axle or other element. The inner or working cylinder 6 cooperates with piston 7 mounted on the piston rod 1. A fitting 8 in the upper part of the reservoir chamber or cylinder 4 is sealed to the piston rod by the usual and standard sealing means 9 and is formed with a flange 10 for receiving and holding the main body of the cylinder 6. A cup shaped element 11 fits over the bottom of the tubular body of the cylinder 6 and rests upon ribs 12 formed in the reservoir cylinder or chamber 4.

A foot valve at the lower end of working space 6A serves to replenish the space with fluid on a suction stroke and a slide valve at the upper end of the space 6B serves to permit flow into and out of this space when the motion of the working cylinder is upward relative to the piston rod (compression stroke) while preventing flow if the motion is in the opposite direction (recoil stroke). These last mentioned valve mechanisms in themselves form no part of the present invention and will not be described in detail.

*Piston structure*

The piston 7 comprises a body 30 having an enlarged lower end 31 of substantially the diameter of the working cylinder. The enlarged lower end 31 is provided with a groove for receiving a sealing element 32 which is held in place by plate 33 fastened to the piston body 30 as by means of riveted over projections 34 of the latter. The piston may be fastened in the piston rod 1 as by means of welding in a socket in the latter, indicated at 35.

*Metering pin structure*

A dash pot bore or cylinder 36 within the piston body accommodates a reciprocable piston or plunger 37 on which is formed a metering pin 38. An orifice plate 39 is located centrally within an enlarged bore 40 in the lower part of the piston 7, by means of prongs 41 (Figure 9). A bead 42 of the orifice plate supports it at a predetermined level with reference to the plate 33 and it is held down against this plate by spring 43. An annular element 44 having spring tongues 45 as indicated (Figure 8), engages the metering pin piston body 37 above the shank of the metering pin proper for urging the metering pin plunger upwardly. The inner part of the piston body is vented to the upper working cylinder recoil space 6B by means of channels 46 (Figures 3, 6, 7) and the space within the dash pot bore 36 communicates with the recoil space 6B through an orifice 47. A vent 48 also communicates with the space 6B but is closed when the metering pin piston moves upwardly, as indicated in Figure 4. Downward movement of the metering pin piston is limited by the short tongues 49 formed in the element 44.

*Compression-limiting check valve*

A central channel 51 through the metering pin proper leads from the space 6A to the space within the dash pot cylinder 36. A check valve comprising a ball 52, seating at 53 and pressed downwardly by a spring 54 is provided. The upper end of spring 54 thrusts against a cross piece 55 mounted in slots 56 in the generally cylindrical upper part 61 of the metering pin plunger. The laterally extending portions 57 of the element 55 seat against the upper end of the dash pot cylinder 36 as shown. An upper bore 60 accommodates and guides the cylindrical upper part 61 of the metering pin piston. As is apparent from Figs. 6, 7, there are free flow passages around element 55 connecting the cylinder 36 with orifice 47.

Air space

The working cylinder 6 will be filled with hydraulic liquid, typically oil, and the reservoir cylinder space 4A will be filled to a level above the flange 10. The oil level may vary depending upon the position of the working cylinder 6 relative to the piston 7. This level varies due to the greater area below the piston 7 as compared to the area above it, which is partially occupied by the piston rod 1. The gas (typically air) trapped above the liquid in the space 4A will accordingly be under compression varying with the position of the parts. While the pressure in this space may be considerable, varying between upper and lower limits of the order of 15 to 45 atmospheres, in a typical automobile shock absorber, this pressure has little or no effect on the operation of the shock for reasons explained below.

Illustrative mounting

The shock absorber may be mounted in any convenient manner. One suitable mounting for a front wheel assembly, combining the shock absorber with a spring S between the frame F and linkage for the wheel W of a car is shown by way of example in Figure 1.

Metering pin taper

The metering pin is shown in Figure 3 in what may be called the normal or static position. In this position, the enlarged part of the pin at B is within the orifice of the orifice plate 39, so that the area of flow around the metering pin through the orifice is the area of the orifice plate opening, indicated at E, less the area of the metering pin at B. As the metering pin moves up, the orifice opens, reaching the maximum where the narrow point C is level with the opening in the orifice plate 39. Continued upward movement brings the tapered lower part of the metering pin into the orifice, so that in the extreme uppermost position of the metering pin (Figure 5), the opening for flow around the metering pin is again closed down to a small area.

Figure 10:
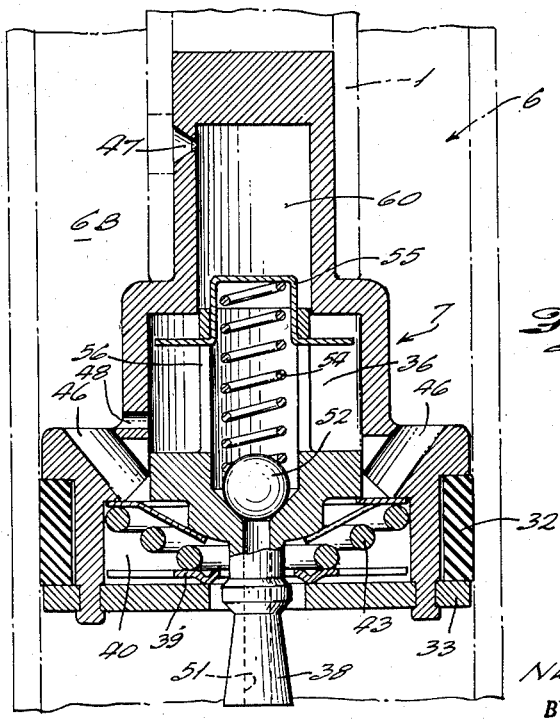
Figure 10 is a view similar to Figures 3, 4 and 5, but showing the parts in a different position.

The metering pin may also move downwardly from the position of Figure 3, and as far as indicated in Figure 10. In this case, the narrow shank at A in Figure 3 will be within the opening of the orifice plate, again providing a wide orifice.

Figure 11:
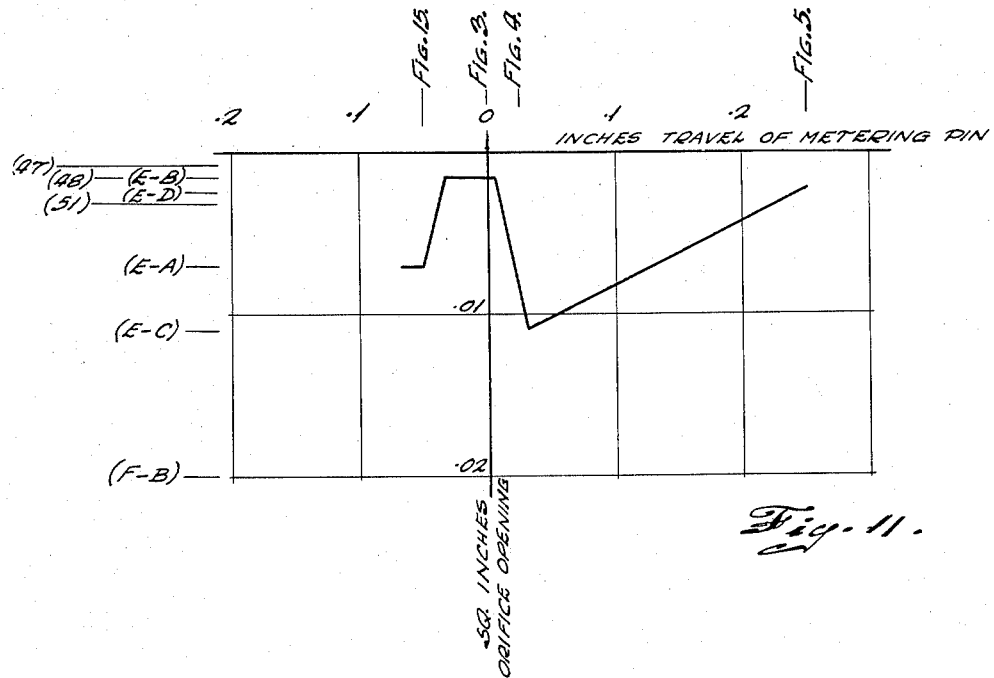
Figure 11 is a graph showing the orifice openings in different positions of the metering pin.

Typical orifice areas for the various metering pin positions are indicated graphically in Figure 11.

The shock absorber of the invention is capacitated to distinguish between applied forces of various frequencies and amplitude, and, furthermore, to react differently to impulses of the same character, depending upon the immediately previous forces to which the shock absorber has been subjected. The action is most conveniently explained by assuming certain typical road conditions and body movements, and describing the reaction of the shock absorber thereto.

Holes

Assuming the vehicle to be travelling on a smooth and level road, and that the wheel comes over a depression or hole in the road, the spring S and the innerspring wheel suspension weight will tend to move the work cylinder 6 downwardly with reference to the piston 7, enlarging the compression space 6A and reducing the recoil space 6B. The suction thus produced in space 6A will open the check 14 at the bottom of the working cylinder 6, thus filling the space 6A from the reservoir space 4A. At the same time, the oil will be forced out of the recoil space 6B in the upper part of the working cylinder.

The entire force of the spring S (aided by the unsprung weight of the wheel and associated parts) is applied to the shock, raising the pressure in space 6B. The foot valve opens so that the pressure in space 6A will be that of the reservoir space 4A. Vent 48 is of sufficient area as to offer negligible resistance to the flow of oil into cylinder 36. The pressure difference between space 6B and 6A will, therefore, be applied across an area equivalent to the diameter of the metering pin in the opening of the orifice plate, tending to drive the metering pin downward. Since as stated the vent 48 is of relatively large diameter, there will be no substantial dash pot action resisting this movement and the metering pin will quickly drop to the position of Figure 10, in which the orifice is open wide and resistance to flow is small. The wheel will thus be permitted to follow the road surface down into the depression with minimum resistance from the shock. This action contrasts sharply with that of conventional shock absorbers in which the maximum hydraulic resistance is applied against all recoil movements.

Depending on the depth and length of the hole and the speed of the car, the wheel may or may not reach bottom. In any event, when the end of the hole is reached, the action will be reversed, the spring will start to compress and the compression stroke of the shock will be initiated. Under these conditions, the foot valve 14 immediately closes, as compression is applied to the space 6A, and the initial very small compression movement of the parts opens the valve at the top of the shock venting the space 6B to the reservoir space 4A. The pressure difference, exerted over the area of the metering pin within the orifice plate opening, will drive the metering pin rapidly upward to the position of Figure 3, thus momentarily constricting the orifice flow area around the metering pin. This constriction, however, is little more than an instantaneous snubbing action as the metering pin continues to move upwardly rapidly to the position of Figure 4, in which position the orifice around the metering pin is again wide open. Since the metering pin piston 37 has now closed off the vent 48, further upward movement of the metering pin will be resisted by the dash pot action in cylinder 36, as the oil can escape therefrom only through the orifice 47. From this point on, various actions are possible depending upon the force applied to the shock absorber.

If the force applied to the shock, after the parts have reached the position of Figure 4, is moderate, the metering pin will drift upward from the position of Figure 4, gradually closing down the orifice around the metering pin as the tapered lower end thereof rises. The rise of the metering pin may cease at any point as the upward thrust on the wheel ceases, and the commencement of recoil will cause it to drift back down to the position of Figure 3. It will be noted by contrast with the action on entering the hole, that the recoil from compression after leaving the hole will be resisted hydraulically due to a wider part of the taper of the lower part of the metering pin being within the orifice. It will further be noted, that the higher pressure in space 6B during the recoil will drive the metering pin downward, its rate of descent being regulated by the dash pot action in cylinder 36, gradually opening the orifice around the metering pin, until such time as the parts reach the position just below that of Figure 4 when the metering pin will drop to the position of Figure 3 and beyond should the recoil continue. Continuation of the action to this point would presuppose another hole and would initiate a repetition of the cycle just described.

Should the force applied to the shock be greater than just assumed, the action will be similar except that the pressure in space 6A may rise to a value sufficient to unseat the ball 52, opening a bypass through the passage 51 in the metering pin and the cylinder 36 parallel to the orifice around the metering pin. Under these conditions, the metering pin will first rise until the ball is unseated. If this action should occur in the wide open position of Figure 10, implying a very fast compression to produce the pressure required to lift the ball in view of the large orifice around the metering pin, the high pressure in space 6A will be communicated to the space 36, thus tending to drive the metering pin downward and permitting spring 54 to reseat the ball. The ball check will thus rapidly seat and unseat maintaining the pressure in space 6A at the set maximum value. Should the set maximum pressure in space 6A be reached only at a later time, the action will be as follows: the metering pin will immediately move up to the position of Figure 4 and its upward movement will thereafter be checked by the dash pot action in cylinder 36. Whenever the pressure in space 6A reaches the value required to lift the ball against the spring 54, the pressure in cylinder 36 will rise, checking the rise of the metering pin and slightly reversing its movement. Thus, this action continues with a gradual rise of the metering pin and gradual closing down of the orifice around it until a point of balance is reached. It will be noted that such rise of the metering pin results in compression of the spring 54, thus raising the pressure in space 6A required to unseat the ball 52, so that a balance will be reached in which the hydraulic resistance of the cylinder is properly related to the spring force for the designed conditions as more fully described below.

Should an even heavier compression impulse be applied to the shock absorber, the safety blowoff will operate, lifting the orifice plate against spring 43 and opening up the entire area of the opening of plate 33 indicated at F around the metering pin.

In the position of Figure 10, the plunger 37 will have uncovered channels 46, establishing substantially free communication between recoil space 6B and dash pot cylinder 36. This prevents downward movement of the plunger 37 from unseating washer 44 and compressing spring 43, which would tend to prevent the orifice plate 39 from blowing should the recoil stroke be interrupted by an excessive sudden compression. Alternatively, the washer 44 may be rigidly fixed in the position of the figures instead of merely resting on spring 43, and in such case the opening of channels 46 into the bore of cylinder 36 will be unnecessary.

*Bumps (rising action)*

If it be assumed that the car is proceeding on a level road and that the wheel encounters a bump, the parts will be in the position of Figure 3. The pressure within space 6A on the compression stroke will immediately force the metering pin up from the position of Figure 3 to that of Figure 4. Thereafter, the action will be as described above, on coming out of a hole. Depending upon the severity of the bump, the metering pin will either move gradually upward closing down the orifice, or the ball 52 will alternately unseat and seat itself until a condition of balance is reached, or in severe cases the orifice plate may blow from time to time.

*Bumps (descent)*

Figure 5:
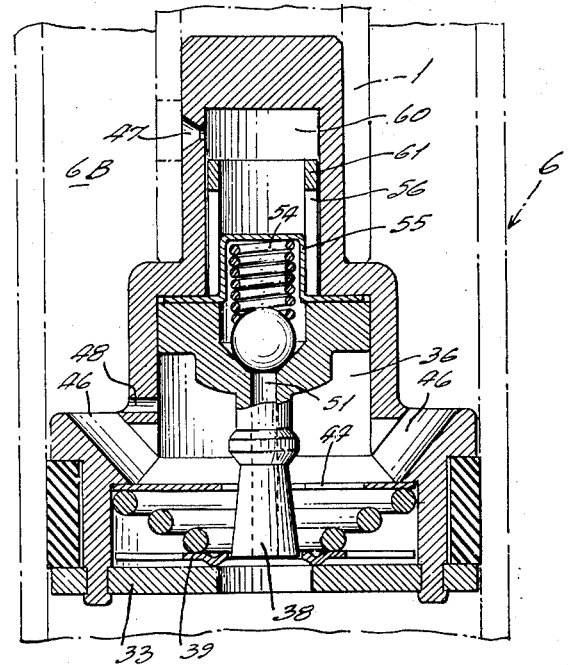

As the descent following a bump commences, the metering pin will normally be in some position intermediate the position of Figure 4 and that of Figure 5. The ball 52 and the orifice plate 39 will, of course, seat instantaneously, the foot valve will open and the valve at top of space 6B will close, thus closing off recoil space 6B from the reservoir cylinder. The metering pin will now drift downward, its descent being regulated by the dash pot action of cylinder 36 until such time as the vent 48 is uncovered and thereafter will drop rapidly to and beyond the position of Figure 3. It will be noted that the recoil action following a bump may thus be entirely different from the recoil action entering a hole.

If the metering pin is in a high position toward that of Figure 5, it may be assumed that the bump has been of sufficient severity so as to compress the vehicle spring fully.

The orifice being contracted, the shock absorber will oppose the spring with a relatively high resistance at the precise time when the unopposed spring would otherwise exert an upward force on the frame far in excess of the static load. As the spring expands, the metering pin is also drifting downward and opening the orifice toward the position of Fig. 4 to give less resistance. It thus becomes possible to maintain tire compression with an approximation to static load conditions and hence no undue reaction on the vehicle or loss of traction.

It will be noted that the action just described is ideally constituted to minimize wheel hop oscillation and also to minimize pitch. The recoil is initially strongly resisted, is then resisted to a minimum, is momentarily snubbed to a maximum and is again resisted to a minimum. This action permits rapid recoil while introducing nonlinearity tending to damp any oscillation.

*Washboard*

In high frequency disturbances, such as encountered on washboard roads, the shock absorber will introduce little or no hydraulic resistance, permitting the springs to absorb the shocks. This is the correct action, since the frequency of a typical washboard is extremely rapid by comparison with a pitch or roll frequency of the car, so that if the springs are allowed to work freely, transmission of the shocks to the car frame is effectively prevented. It will be noted that a washboard frequency is communicated to the metering pin plunger as a reversal of pressure difference between spaces 6A and 6B, tending to reciprocate the metering pin. Further, as the metering pin is driven upward from the position of Figure 3, the orifice is opened, thus resulting in less effective pressure drop on the recoil for given flow through the orifice, while if the metering pin is driven downward by the recoil the orifice tends to close, thus increasing the pressure drop for given flow on the operating compression stroke. The result is that the net movement on each oscillation of the metering pin is upwards and it quickly assumes the position of Figure 4, with the orifice wide open or substantially so. The dash pot action resisting this movement is not significant since the vent 48 is open until the metering pin plunger has risen to cover it.

*Spring rate*

In conventional suspensions, the spring rate is normally about ten percent (10%), which is to say, the added pounds of spring force per inch of compression or reduction of spring force per inch of expansion, is about ten percent (10% of the sprung weight carried by the spring suspension in static position. Springs of such stiffness are undesirable in absorbing washboard frequencies but are tolerated because necessary to give sufficient force in large amplitude low frequency bumps or pitching and rolling movements. By arranging for a progressively increasing hydraulic resistance in large amplitude compressions as determined by the upward travel of the metering pin and compression of the ball check spring 54, it becomes possible to supplement the spring force on such compressions by a large dynamic hydraulic resistance of approximately equal magnitude to the spring resistance, so that a spring of about half the stiffness of those heretofore used may be employed. As will be apparent, such a spring having about a five percent (5%) rate will result in greatly improved riding qualities in the vehicle.

What is claimed is:

1. In a hydraulic shock absorber, valve means for regulating flow from a working space comprising an element movable for varying a flow orifice, cooperating dash pot cylinder and plunger members, the orifice varying element being carried by one of the said dash pot elements, the said dash pot member being subjected on one side to the pressure within the dash pot and on the other to pressure within the working space, a check valve in the said dash pot member for admitting fluid from the working space into the dash pot cylinder behind the plunger, and a spring in the dash pot cylinder for yieldingly holding the check valve closed, the spring acting between the cooperating dash pot members and compressing as they are forced together for increasing the working space pressure required to open the check valve.

2. Valve means according to claim 1, in which the spring is pre-loaded, whereby pressure required to open the check valve varies between predetermined values during the movement of the movable element between predetermined positions.

3. Valve means according to claim 1, in which the spring acts between the check valve and a member slidably carried by the first said dash pot member and positioned for engagement with the other dash pot member when the orifice varying movable element is in a predetermined position, whereby the pressure required to open the check valve increases as the dash pot member carrying the check valve moves in one direction, and the spring moves bodily therewith when it moves in the opposite direction.

4. In a hydraulic shock absorber, valve means for regulating flow from a working space comprising an element movable for varying a flow orifice, a dash pot cylinder, a dash pot plunger carried in the cylinder and carrying the said orifice varying element, the dash pot plunger being subjected on one side to the pressure within the dash pot cylinder and on the other to pressure within the working space, a check valve in the plunger for admitting fluid from the working space into the dash pot cylinder behind the plunger and a spring within the dash pot cylinder for resisting opening of the check valve and compressible by the plunger for increasing the pressure required to open the check valve as the plunger moves into the cylinder.

References Cited in the file of this patent
UNITED STATES PATENTS

| | | |
|---|---|---|
| 1,099,073 | Moir | June 2, 1914 |
| 1,379,092 | Fraccascia | May 24, 1921 |
| 1,635,284 | Lomar | July 12, 1927 |
| 1,780,531 | Messier | Nov. 4, 1930 |
| 1,891,977 | Gould | Dec. 27, 1932 |
| 2,027,966 | Dubonnet | Jan. 14, 1936 |
| 2,033,396 | Perrine | Mar. 10, 1936 |
| 2,036,955 | Padgett | Apr. 7, 1936 |
| 2,095,112 | Wallace | Oct. 5, 1937 |
| 2,212,833 | Huber | Aug. 27, 1940 |
| 2,240,644 | Focht | May 6, 1941 |
| 2,325,430 | Setz | July 27, 1943 |
| 2,465,680 | Focht | Mar. 29, 1949 |
| 2,473,043 | Whisler | June 14, 1949 |
| 2,501,121 | Caserta | Mar. 21, 1950 |
| 2,507,266 | Patriquin | May 9, 1950 |